Nov. 5, 1968 W. D. MUNRO 3,409,755
DEVICE FOR MEASURING THE TEMPERATURE OF A WELD
Filed Feb. 8, 1965 2 Sheets-Sheet 1
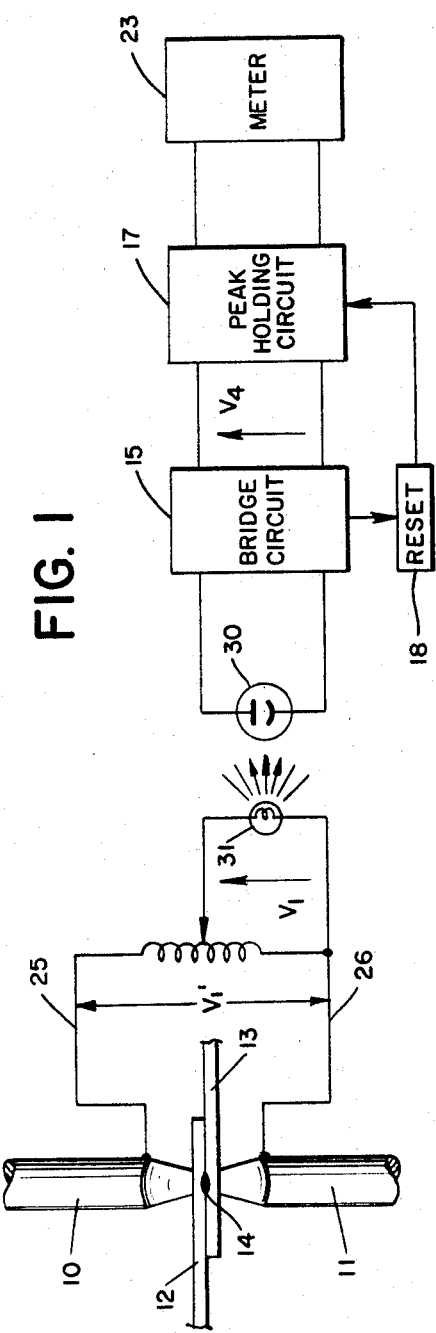
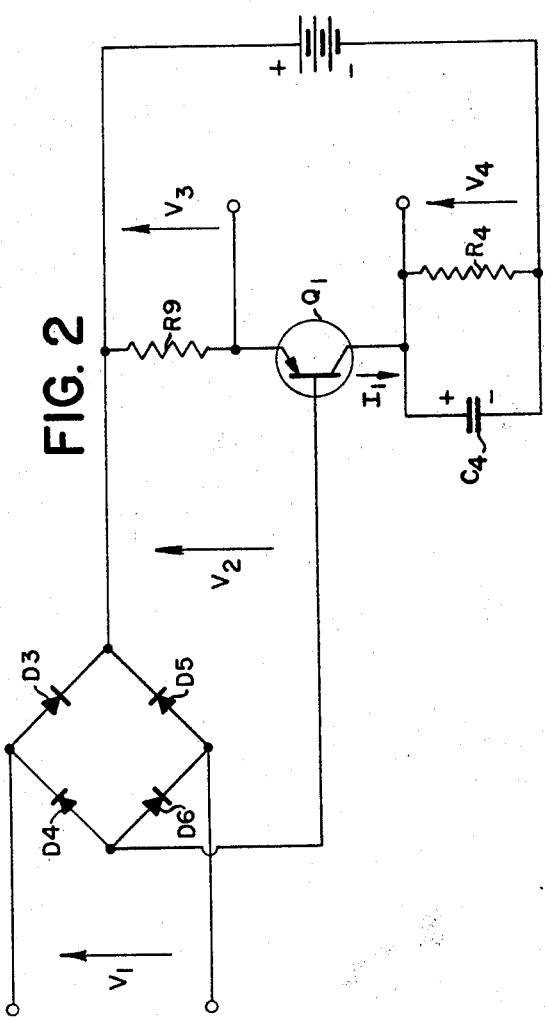
INVENTOR.
WILLIAM D. MUNRO
BY *Nolte & Nolte*
ATTORNEYS

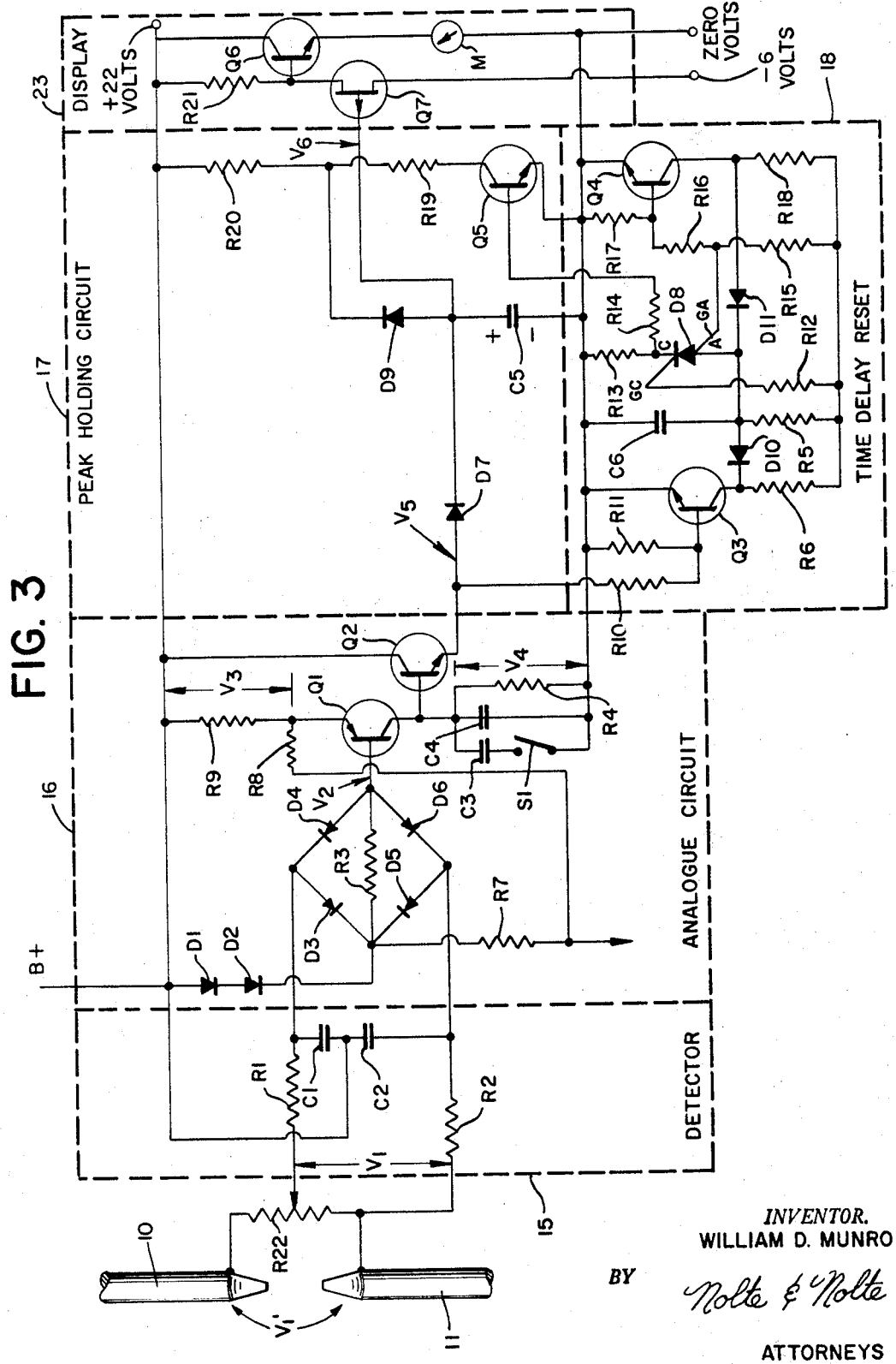

United States Patent Office 3,409,755
Patented Nov. 5, 1968

3,409,755
DEVICE FOR MEASURING THE TEMPERATURE OF A WELD
William D. Munro, Taunton, Mass., assignor to The Sippican Corporation, Marion, Mass., a corporation of Massachusetts
Filed Feb. 8, 1965, Ser. No. 431,125
17 Claims. (Cl. 219—110)

ABSTRACT OF THE DISCLOSURE

Apparatus to indicate the strength of a resistance weld by non-destructive means. An electrical analog circuit senses the voltage across the welding electrodes during the formation of the weld and generates a voltage which simulates the temperature of the weld nugget formed. A voltmeter coupled with a peak holding circuit indicates the maximum voltage produced by the analog circuit and thereby indicates the temperature and quality of the weld.

---

This invention relates to a resistance welding monitor which is responsive to the voltage across the welding electrodes during the formation of a weld. It is characterized by the use of an electrical analog circuit which simulates the temperature of the weld nugget formed between the two pieces joined together during a welding cycle. The monitor has the ability of sensing changes in the welding temperature between successive welding cycles and indicating any significant changes that occur that would effect the strength and quality of the welds.

In resistance welding, two or more parts are joined together by passing an electric current through the parts at the desired point of welding through electrodes which engage these parts. Since the weld joining the parts together is hidden from view it is desirable to provide some means of protecting against any change from the original welding set up conditions which may occur while a welding operation is being repeated. Such variations in welding conditions may occur due to changes in the supply voltage or time that the welding operation is performed within. Moreover, variations in welding conditions may occur due to changes in electrical conductivity between the electrodes and the work piece, or changes in the surface condition of the parts being welded. These and other variables may result in the production of defective welds.

The strength of a resistance weld cannot be determined by mere visual observation. It is possible to make destructive tests of the weld to determine its strength, but this cannot be done to any finished article employing the weld. It is therefore important to set up quality control procedures to determine, by a sampling process, if the strength and quality of the welds being made has deteriorated beyond established manufacturing limits. It has been known in the art that some control over the strength and quality of resistance welds may be achieved by monitoring either the current supplied to the weld, the pressure of the electrodes against the welding pieces, the change in resistance of the weld during its formation, or the total power supplied to form the weld. None of the conventional welding monitors however claim to control the strength and quality of a resistance weld by predicting the temperature of the weld during its formation. Moreover, none of the conventional monitors provides a welding analog circuit that measures the voltage across the welding electrodes to predict the temperature of the weld.

It is therefore an object of my invention to provide a resistance welding monitor for controlling a strength and quality of welds during formation by providing an apparatus which is responsive to changes in welding temperature.

It is also an object of my invention to provide an electronic analog computing means for determining the change in temperature of a resistance weld during its formation by measuring the voltage applied to produce that weld.

It is another object of my invention to provide a display indicating the output signal from the above-mentioned computer circuit to indicate the attainment of a prescribed temperature change in the weld during its formation.

It is a further object of my invention to provide an apparatus having a means for indicating when the temperature of a resistance weld during its formation falls outside the limits prescribed for controlling its strength and quality.

The novel features considered characteristic of the invention are set forth above. The invention itself, however, both as to its organization and its method of operation, together with additional objects and advantages thereof will be understood from the following description of a specific embodiment when read in connection with the accompanying drawings, in which:

FIG. 1 is a simplified form of one embodiment according to my invention,

FIG. 2 is an analog circuit designed for substitution with a portion of the circuit of FIG. 1 and shown for the purposes of describing the improvements according to my invention, and FIG. 3 is a circuit diagram of a preferred embodiment of my invention.

FIG. 1 illustrates one embodiment according to my invention wherein changes in the strength and quality of a weld 14 joining pieces 12 and 13 inserted between electrodes 10 and 11 can be determined by the changes in intensity of lamp 31. At the start of each welding cycle, electrodes 10 and 11 are brought into electrical contact with work pieces 12 and 13 respectively. A high current is conducted through a path common to the point of contact of the work pieces and because of the resistance present, produces a sufficient amount of heat to fuse the work pieces together and form weld nugget 14. During the formation of the weld nugget, a voltage $V_1'$ is produced across electrodes 10 and 11. Lamp 31 is coupled to electrodes 10 and 11 through variable autotransformer 32. Transformer 32 can be adjusted to vary voltage $V_1$ in proportion to $V_1'$ to compensate for differences between welding machines and work pieces. The filament of lamp 31 responds thermally to voltage $V_1$ in the same manner as weld nugget 14. As the actual weld temperature developed within nugget 14 modifies the weld voltage sampled by conductors 25 and 26 during the weld cycle, it also in turn modifies the temperature of the filament of lamp 31. The filament temperature has been found through experimentation to simulate the actual weld temperature developed within nugget 14 and thus deviations in the filament temperatures can be read as deviations in the actual weld temperature.

The intensity of the filament of lamp 31 is monitored by a photocell 30. Bridge circuit 15 connected to photocell 30 produces a voltage $V_4$ at its output corresponding to the intensity of the filament of lamp 31. A metering circuit 23 connected to the peak holding circuit 17 provides a reading or indication of the magnitude of voltage $V_4$ subsequent to each welding cycle. Peak holding circuit 17 connected to the output of the bridge circuit stores voltage $V_4$ between cycles. At the start of the next welding cycle reset circuit 18 is activated by bridge 15 to discharge the storage unit of peak holding circuit 17 so as to reset meter 23.

Through repeated experimentation it has been found that there is good correlation between predicated temperature changes from weld to weld indicated on metering circuit 23 and the estimated actual weld temperature from weld sections made by viewing pealed-apart weldments. Due to the limited life of lamp circuit 31, it became necessary to substitute an all electronic circuit to duplicate the response of the lamp filament and photocell combination. The basic circuit, illustrated in FIG. 2, consists of a bridge rectifier in combination with an analog type amplifier circuit and provides a voltage $V_4$ analogous to the weldment temperature at its output. The input of the bridge rectifier circuit consisting of diodes D3, D4, D5 and D6 is connected to voltage $V_1$ either directly, or indirectly through a voltage divider to the electrodes of the welder. The output of the rectifier bridge provides a unidirectional voltage $V_2$ of a single polarity to transistor Q1. The bridge rectifier also provides the proper bias voltage to the input of Q1 by the voltage produced on one leg of the bridge by the combination of D1, D2 and R7. Voltage $V_2$ on the base of transistor Q1 produces a voltage $V_3$ across emitter resistor R9 equal to voltage $V_2$ less the emitter-to-base potential drop of Q1. The voltage across R9 produces a current I1 which flows substantially into the collector of Q1. A portion of the current I1 charges capacitor C4 while still another portion is shunted through resistor R2. The thermal electrical analogy simulated by the circuit of FIG. 2 provides for the mass and specific heat of the weldment to be represented by the capacitance of C4. The thermal conductivity of the weldment is represented by resistor R4. The heating (B.t.u.'s/second) of the weldment by the action of the weld voltage is analogous to I1 (coulombs/second). The above combination produces a voltage $V_4$ across capacitor C4 which is analogous to the weldment temperature. The circuit is typical of an R-C combination used in thermal analogue computing. It is not analogous to a simple integrating circuit due to the presence of resistor R4 representing the heat loss.

A full schematic representation of an embodiment according to my invention is shown in FIG. 3. The welding voltage magnitude $V_1'$ appearing across electrodes 10 and 11 is adjusted by potentiometer R22 to a suitable level and applied as voltage $V_1$ to the diode bridge. A balanced filtering circuit consisting of capacitors C1 and C2, and resistors R1 and R2 couples the diode bridge to voltage $V_1$ and eliminates the industrial noise or static which might affect the overall performance of the welding monitor. The unidirectional voltage $V_2$ appearing at the output of the bridge rectifier is fed into the base of transistor Q1. The analog circuit consisting of transistor stage Q1 and the bridge rectifier correspond to the analog circuit of FIG. 2. In a manner similar to that described for the circuit according to FIG. 2, voltage $V_4$ produced at the collector of Q1 and analogous to the weldment temperature appearing across electrodes 10 and 11 is fed to the base of emitter follower stage Q2 and emerges as voltage $V_5$ at the output. Emitter follower Q2 is used to isolate the analogue network from the peak holding circuit consisting of D7 and C5. Voltage $V_5$ is applied to both the peak holding circuit and the time delay reset circuit. With respect to the former, $V_5$ is fed to storage capacitor C5 through diode D7. Diode D7 electrically isolates C5 from the low impedance circuit of Q3 and permits C5 to charge up to the peak value of voltage $V_5$. This is indicated as voltage $V_6$ appearing on the base of Q7. Transistor Q7 is a p-channel unipolar field effect transistor having an input resistance of several thousand megohms and is used to isolate the peak holding circuit from the meter M. Transistor stage Q6 is connected as an emitter follower to couple the high impedance output of stage Q7 to meter M.

In order to provide that the peak temperature predicated be observed on a mechanical meter movement, it is necessary to delay the resetting of the peak holding circuit after each welding cycle. The time delay circuit chosen to allow the meter indication to come to rest and be observed is regulated by a silicon control switch (SCS) D8, a four layer PNPN semiconductor in common use.

After the completion of the welding cycle and the subsequent removal of welding voltage across welding electrodes 10 and 11, D8 is reverse biased due to the voltage across the timing capacitor C6 being less than the voltage provided at the anode gate $G_A$ by the voltage divider formed by R15 and R16 and the base diode voltage of transistor Q4. With silicon control switch D8 in reverse biased condition, there is no drive from its cathode C to reset transistor Q5. As C6 charges through R5 the anode A of D8 eventually becomes forward biased with respect to anode gate $G_A$ and switch D8 fires to provide transistor Q5 with a base drive through R13 and R14. Transistor Q5 in turn causes diode D9 to become forward biased and to conduct the charge stored within capacitor C5 through R19 and Q5 to thereby reset the peak holding circuit 17 and cause readout meter M to return to zero indication. An additional transistor stage Q4 is provided to stabilize the operation of D8. The holding current necessary to maintain switch D8 in a stable condition cannot sufficiently be supplied by resistor R5 due to its high resistance. It is therefore necessary for transistor Q4 to couple resistor R18 into D8's conduction circuit through diode D11. If the holding circuit provided by stage Q4 were not used, switch D8 would oscillate on and off as C6 charged through R5 and discharged through D8.

If the next welding cycle occurs before C6 becomes sufficiently charged through R5 to reverse bias D8, then transistor stage Q3, along with components D10, R10, R11 and R6 will reset the timer during the presence of voltage $V_5$ by shunting the holding current from R15 around switch D8 so as to reverse bias D8. When voltage $V_5$ no longer provides drive to the base of transistor Q3, switch D8 is unclamped and the timer delay cycle is restarted.

The circuit of FIG. 3 also contains a switch S1 to selectively add a capacitor C3 across C4 in the analogue circuit. This allows the analogue circuit to be adapted to predict welding temperatures of materials having different masses and specific heats. Moreover, it is conceivable that R4 may also be adjusted to accommodate materials having different thermal conductivity.

While only two of the embodiments according to my invention have been illustrated it is apparent that the invention is not limited to the exact form or use shown and that many variations may be made in the particular design and configuration without departing from the scope of the invention as set forth in the appended claims.

What is claimed is:

1. An apparatus for monitoring successive welding operations of an electrical welding system comprising means for sensing the welding voltage produced by said welding system for predicting the maximum temperature of successive weldments, and means connected to said above-named means for indicating said temperatures after each weld, wherein said sensing means comprises a lamp connected to the welding voltage for producing a light having an intensity responsive to said voltage, means for producing a voltage proportional to the intensity of said light, and means for storing said voltage for a predetermined portion of the welding cycle.

2. The sensing means as recited in claim 1 wherein said lamp comprises;
   a light bulb having an incandescent filament connected to said welding voltage.

3. The apparatus as recited in claim 1 wherein said measuring and producing means comprises;
   a photosensitive transducer communicative with said light for producing a voltage proportional to the intensity of said light,
   a rectifier connected to the output of said transducer for converting said above-named voltage into a unidirectional voltage, and a holding circuit connected to the output of said rectifier for producing a second voltage equal in magnitude to the peak value of said unidirectional voltage.

4. The apparatus as recited in claim 1 wherein said indicating means comprises a voltmeter.

5. An apparatus for monitoring the strength and quality of welds produced across the electrodes of an electric welding apparatus comprising;
a lamp electrically connected across said electrodes for producing a light responsive to the voltage across said electrodes,
a photosensitive transducer responsive to said light for producing a voltage proportional to the intensity of said light,
a rectifier means connected to said transducer for converting said above-named voltage into a unidirectional voltage having a single polarity,
storage means connected to said rectifier means for producing and storing a second voltage proportional to the peak value of said unidirectional voltage,
a meter connected to the output of said storage means for indicating the magnitude of said second voltage,
and reset means connected to said storage means for discharging said storage means a predetermined time after each weld cycle so as to return the indication on the meter to zero.

6. The apparatus as recited in claim 5 wherein said photosensitive transducer comprises a photoelectric tube.

7. The apparatus as recited in claim 5 wherein said lamp comprises an incandescent light bulb.

8. The apparatus as recited in claim 5 wherein said rectifier means comprises a bridge rectifier having an arrangement of four diodes so as to produce an output voltage having a single polarity in response to a multipolarity input voltage.

9. An electrical measuring and indicating apparatus for determining the maximum weld temperature of a weldment from a first signal produced across the electrodes of an electrical welding system during a welding cycle comprising;
an analog device connected across said welding electrodes for producing a second signal proportional to the temperature of said weld formed therebetween,
a storage means connected to the output of said above-named device for producing and storing a third signal equal in magnitude to the peak value of said second signal, and
a metering circuit connected to the output of said storage means to indicate the magnitude of said third signal.

10. The apparatus as recited in claim 9 additionally comprising a filter means interposed conductively between the electrodes and said analog circuit to filter out stray noise signals generated by the electrodes during a welding cycle.

11. The apparatus as recited in claim 10 wherein said filter means comprises a balanced low-pass type filter.

12. The apparatus as recited in claim 10 additionally comprising a voltage divider interposed conductively between said electrodes and said filter to provide for the adjustment of said first signal produced across said electrodes.

13. The apparatus as recited in claim 9 wherein said analog device comprises;
a first analog generating means producing a signal to simulate the thermal-conductivity of heat away from the weld,
a second analog generating means providing a signal to simulate the mass and specific heat of the weld,
a third analog generating means providing a signal to simulate the quantity of heat supplied to the weld, and
a means for combining said first, second and third analog means to produce said second signal.

14. An electronic measuring and indicating apparatus for determining the maximum weld temperature from the voltage produced across the electrodes of an electrical welding system during a welding cycle comprising;
an electronic analog circuit electrically connected across said welding electrodes for producing a second voltage proportional to the temperature of said weld formed therebetween,
a peak holding circuit connected to the output of said analog circuit for producing and storing a third voltage equal in magnitude to the peak value of said second voltage,
a voltmeter electrically connected to the output of said peak holding circuit to indicate the magnitude of said third voltage.

15. An electronic measuring and indicating apparatus for determining the maximum weld temperature of a weldment from a first voltage produced across the electrodes of an electrical welding system during a welding cycle comprising;
an adjustable voltage means connected across said electrodes for producing a second voltage proportional to said first voltage at its output,
a filter means connected to the output of said adjustable voltage means to filter out stray noise signals within said second voltage generated by the electrodes during the welding cycle,
an electronic analog circuit connected to the output of said filter for producing a third voltage proportional to the temperature of the weldment formed between the electrodes,
a peak holding circuit connected to the output of said analog circuit for producing and storing a fourth voltage equal in magnitude to the peak value of said third voltage, and
a voltmeter connected to the output of said peak holding circuit to indicate the magnitude of said fourth voltage.

16. The apparatus as recited in claim 15 wherein said analog circuit comprises;
a full wave bridge rectifier connected to said filter means for producing a unidirectional output voltage having a single polarity proportional to said second voltage,
an amplifier connected to the output of said rectifier bridge for producing a current at its output proportional to the heat applied to a weld during a weld cycle,
a capacitor electrically connected to the output of said amplifier and proportional in magnitude to simulate the mass and specific heat of the weldment,
a resistor electrically connected across said capacitor and adjusted to simulate the conductivity of heat away from the weldment so as to produce said third voltage due to the current therethrough.

17. The apparatus as recited in claim 15 additionally comprising a reset circuit having an input connected to the output of said analog circuit and whose output is connected to the peak holding circuit such that the removal of voltage at the input causes the output of the reset circuit to discharge the voltage stored in the peak holding circuit after a predetermined delay in time.

References Cited

UNITED STATES PATENTS 3,068,350  12/1962  Archer _____ 219—110

RICHARD M. WOOD, *Primary Examiner.*

P. W. MAY, *Assistant Examiner.*

UNITED STATES PATENT OFFICE
CERTIFICATE OF CORRECTION

Patent No. 3,409,755                      November 5, 1968

William D. Munro

It is certified that error appears in the above identified patent and that said Letters Patent are hereby corrected as shown below:

Column 3, line 26, "R2" should read -- R4 --; line 65, "base" should read -- gate --; line 71, "predicated" should read -- predicted --.

Signed and sealed this 28th day of April 1970.

(SEAL)
Attest:

Edward M. Fletcher, Jr.                 WILLIAM E. SCHUYLER, JR.
Attesting Officer                        Commissioner of Patents